United States Patent [19]

Mouche' et al.

[11] Patent Number: 4,802,996

[45] Date of Patent: Feb. 7, 1989

[54] BIOCIDES FOR TREATING INDUSTRIAL WATERS, PARTICULARLY FLUE GAS DESULFURIZATION SCRUBBER SLUDGE

[75] Inventors: Richard J. Mouche', Batavia; Mei-Jan L. Lin, Naperville, both of Ill.

[73] Assignee: Nalco Chemical Company, Naperville, Ill.

[21] Appl. No.: 92,826

[22] Filed: Sep. 3, 1987

Related U.S. Application Data

[63] Continuation-in-part of Ser. No. 911,853, Sep. 26, 1986, abandoned, which is a continuation-in-part of Ser. No. 886,480, Jul. 17, 1986, abandoned.

[51] Int. Cl.$^4$ ................................................ C02F 1/68
[52] U.S. Cl. ..................... 210/764; 210/749; 422/28; 422/36; 514/478
[58] Field of Search ............... 210/759, 764, 749; 422/28, 36; 424/130; 514/478

[56] References Cited

U.S. PATENT DOCUMENTS

| | | | |
|---|---|---|---|
| 2,801,216 | 7/1957 | Yoder | 252/8.554 |
| 3,167,471 | 1/1965 | Kovacs et al. | 424/130 |
| 3,198,733 | 8/1965 | Pera et al. | 514/478 |
| 3,398,181 | 8/1986 | Karsten | 210/764 |
| 3,945,938 | 3/1976 | Rowan | 514/478 |
| 4,495,200 | 1/1985 | Lindstrom et al. | 210/764 |
| 4,532,117 | 7/1985 | Delaney | 210/764 |

FOREIGN PATENT DOCUMENTS 833558  12/1979  U.S.S.R. ............................ 514/478

*Primary Examiner*—Peter Hruskoci
*Assistant Examiner*—Coreen Y. Lee
*Attorney, Agent, or Firm*—Premo John G.; Donald G. Epple; Anthony L. Cupoli

[57] ABSTRACT

Sulfate-reducing bacteria present in industrial waste waters can be controlled by using either the biocide glutaraldehyde or a blend of sodium dimethyldithiocarbamate and disodium ethylene bisdithiocarbamate.

3 Claims, No Drawings

BIOCIDES FOR TREATING INDUSTRIAL WATERS, PARTICULARLY FLUE GAS DESULFURIZATION SCRUBBER SLUDGE

Introduction

This is a continuation-in-part application pending from patent application, Ser. No. 911,853, filed Sept. 26, 1986, now abandoned, which in turn was a continuation-in-part application from patent application Ser. No. 886,480, filed July 17, 1986, now abandoned.

Certain industrial process waters become highly contaminated with sulfate-reducing bacteria, particularly the species, *Desulfovibrio desulfricans*. A good example of such industrial process water contamination is found in the sludges and slurries produced as a result of flue gas desulfurization (FGD) scrubbers. Such sludges or slurries are produced due to scurbbing gases in the stacks of large boilers such as are found in utilities. These large boilers utilize high sulfur fuels such as coal or high sulfur fuel and residual oils.

FGD system sludge contains high concentrations (>10%) of gypsum ($CaSO_4.2H_2O$) and calcium sulfite hemihydrate ($CaSO_3.\frac{1}{2}H_2O$). The lower areas of thickeners and ponds become anaerobic, resulting in an ideal growth environment for sulfate-reducing bacteria of the species Desulfovibrio. The growth of Desulfovibrio reduces sulfate and sulfite and evolves hydrogen sulfide ($H_2S$) gas to the atmosphere. Hydrogen sulfide generation is an odor problem even at low levels. The bacteria can also cause corrosion of construction materials. These problems are particularly severe in warm weather, such as in the summer sessions and much of the year in the southern United States. The use of biocides in actual FGD systems has been rather rare.

A common method of controlling sulfate-reducing bacteria is the use of non-oxidizing boicides. These materials are well-known and are illustrated by such well-known materials as methylene bis thiocyanate, metronidazole, and blends of certain dithiocarbamates and gluteraldehyde. 2,2'-dibromo-3-nitrilopropionamide (DBNPA) has shown some success in controlling sulfate-reducing bacteria in FGD systems.

It has been found, however, that when these industrial waters contain sulfate-reducing bacteria in quantities greater than 10 colonies per ml that sulfate-reducing bacteria controlling biocides are ineffective or require such large dosages as to be impractical.

The Invention

The invention is a method of controlling sulfate-reducing bacteria present in industrial waste waters and sludges which have a sulfate-reducing bacteria population greater than 10 colonies per ml. The method comprises treating such waters with an effective amount of a biocidal composition comprising either:

a blend of sodium dimethyldithiocarbamate and disodium ethylene bisdithiocarbamate, or glutaraldehyde The dosage of these biocides is usually within the range of between about 5–500 ppm by weight.

Biocides Known to be Effective Against Sulfate-Reducing Bacteria

The literature is replate with references to biocides that are effective in controlling sulfate-reducing bacteria. Typical and illustrative, but non-inclusive of such materials, are the following biocidal solutions:

| | |
|---|---|
| Composition No. 1 | 20% 2,2'-dibromo-3-nitrilopropionamide, |
| Composition No. 2 | 1.15% 5-chloro-2-methyl-4-isothiazolin-3-one and 0.35% 2-methyl-4-isothiazolin-3-one |
| Composition No. 3 | 10% Methylene bis thiocyanate (MBT) |
| Composition No. 4 | 45% Glutaraldehyde |
| Composition No. 5 | 0.9% Metronidazole |
| Composition No. 6 | a blend of 15% Sodium dimethyldithiocarbamate, and 15% Disodium ethylene bisdithiocarbamate |
| Composition No. 7 | a solution of hexahydro-1,3,5-tris-(2-hydroxyethyl)-s-triazine |

Of the above biocides, preferred are Compositions No. 4 and 6 with Composition 6 being most preferred. These biocides may be used over a large dosage range depending upon the effectiveness of the biocides.

In addition to using the blend of carbamates described in Composition No. 6, other biocidally effective thiocarbamates may be used.

The invention is particularly effective in controlling flue gas scrubber sludges or slurries when the concentration of the sulfate-reducing bacteria is about or greater than 100 colonies per ml.

The following is presented by way of example:

Procedure

Five gallons of thickener underflow sludge was obtained from three Southern utilities.

Tests were conducted on the fresh sludge within a week after the sample was taken except the sludge from Utility No. 1 which was about 1 month old. All of the biocides were incubated in the sludge using stoppered Erlenmeyer flasks at 30° C. for 24 hr., initially at dosages of 200 and 2000 ppm. Triplicate 0.1 ml. inoculations were mixed into ferric citrate-sodium sulfite-tryptone agar medium (approximately 10–15 ml) for each of the sludge sample. Black iron sulfide colonies would develop in the agar due to growth of sulfate-reducing bacteria. The number of black Desulfovibrio colonies were counted after 48 hr., 72 hr., 96 hr. or 144 hr., depending on growth rate.

In the followup testing of sludge from Utility No. 3, the sludge was:

1. First aerated with compressed air through a diffuser for one hour before the biocides were added to simulate forced oxidation;
2. Mixed with biocides in 100 ml open beakers at room temperature overnight using a stir plate and mixing bars before being cultured to simulate an open thickener; and,
3. Mixed with biocides at 10, 50 and 100 ppm concentration.

Results and Discussion

Thickener Underflow from Utility No. 1

The thickener underflor from Utility No. 1 was evaluated first to see if any of the biocides could succeed in killing Desulfovibrio in the high-sulfur containing FGD sludge. Five biocides, Composition Nos. 1, 2, 3, 5 and 6 were used at 200 ppm and 2000 ppm. The high dosage was utilized as the upper limit of a biocide program dosage.

A table summarizing results is given in Table I. The results of the blank without biocide treatment gave a low Desulfovibrio count of 5–10/ml of sludge. Of the five biocides, Composition No. 6 and Composition No.

5 gave effective kill at both 200 and 2000 ppm. The other biocides were ineffective at either dosages, except Composition No. 1 which was somewhat effective at 2,000 ppm.

Thickener Underflow from Utility No. 2

The FGD sludge from Utility No. 2 was determined to contain 1000-1500 sulfate-reducing bacteria per ml. of sludge. This level of bacteria count is extraordinarily high for FGD sludge. Since this Utility uses waste water treatment plant effluent as makeup to their cooling towers, and the cooling system blowdown ends up as scrubber water makeup, high levels of bacteria in the FGD system could be expected. The sulfate reducing bacteria in the system were at extremely high concentrations and are out of control in terms of population. Reports from the sales representative indicated the presence of strong hydrogen sulfide odors from the thickener (clarifier).

Three series of tests were conducted to determine the type and dosage of a biocide treatment program which can significantly reduce the population of Desulfovibrio.

In the first series of testing, dosages as high as 6000 ppm of non-oxidizing biocides such as Composition Nos. 1, 2, 3, 5 and 6 had little or no effect in reducing the Desulfovibrio population.

TABLE I

Bacterial growth versus biocide dosage for Utility No. 1

| Composition No. | Dosage ppm | Tube #1 72 hrs | Tube #1 144 hrs | Culture Result Tube #2 72 hrs | Tube #2 144 hrs | Tube #3 72 hrs | Tube #3 144 hrs |
|---|---|---|---|---|---|---|---|
| Blank | 0 | **1-2 | *+ | 1-2 | + | 1-2 | + |
| Blank | 0 | 1-2 | + | 1-2 | + | 1-2 | + |
| 6 | 200 | 0 | 1 | 0 | 1 | 0 | 1 |
| 6 | 2000 | 0 | 0 | 0 | 0 | 0 | 0 |
| 1 | 200 | 0 | + | 1-2 | + | 0 | + |
| 1 | 2000 | 0 | 0 | 0 | + | 0 | 0 |
| 5 | 200 | 0 | 0 | 0 | 0 | 0 | 0 |
| 5 | 2000 | 0 | 0 | 0 | 0 | 0 | 0 |
| 2 | 200 | 1-2 | + | 0 | + | 1-2 | + |
| 2 | 2000 | 0 | 0 | 1-2 | + | 0 | + |
| 3 | 200 | 0 | + | 0 | 0 | 0 | + |
| 3 | 2000 | 0 | 0 | 1-2 | + | 0 | 0 |

NOTE:
*"+" means complete bacterial growth (black tube)
**Approximate number of colonies counted

Thickener Underflow from Utility No. 3

Utility No. 3 was using Composition 1 to treat its FGD system thickener sludge for Desulfovibrio. The product was added once a week at 10 ppm dosage to the top of the thickeners and was found effective. Lower counts were obtained after biocide addition. The sludge turned from a dark to a light color immediately after the application according to the operators.

Laboratory Testing at Lower-Oxygen Condition

The sludge after Composition 1 treatment for one week showed a medium level of 100-200 bacteria per ml. of sludge. It was concluded that Composition No. 6 and Composition No. 4 showed the best killing at both 200 ppm and 2,000 ppm. Composition No. 1, the biocide in use at the Plant, as well as Composition No. 2, No. 3 and No. 5 was not effective at 200 ppm dosage.

Laboratory Testing at More Aerated Condition

Under the more aerated condition testing, similar conclusions to the earlier findings were drawn: Composition No. 6 and Composition No. 4 again surfaced as the best biocides among all tested including a newly added Composition No. 7. These two biocides outperformed the DBNPA.

An evaluation comparing various biocides using an aerated type test method with constant mixing in an open atmosphere showed little or no difference to those using closed Erlenmeyer flasks. However, a lower dosage was needed under the aerated or oxygenated condition.

Due to aging of the sludge during transportation to the laboratory, resulting in increased numbers of sulfate reducing bacteria, exact dosage of biocide treatment for the actual FGD system should be determined on-site using the same procedure. This part of the result indicates that trends of biocide performance can be evaluated for any sludge in the lab.

The results are listed in Tables II and III. The data represents the number of colonies seen growing in the culture test tubes.

The results from Table II indicate that the bacteria in the sludge overgrew the tubes because the populations were still too high. Composition No. 4 at 50 ppm and 100 ppm effectively kills the bacteria. Composition No. 6 showed the second best results. The test was repeated (Table III) but more oxidation of the sludge was allowed before biocides were added, and stirred overnight. This time Composition No. 6 clearly reduced the bacteria population at 50 ppm and 100 ppm dosages. With more oxidation in the sludge, dosage requirement should be even lower. Under these more oxygenated conditions, Compositions No. 6 was the choice over Composition No. 4.

TABLE II

Biocide Test Results
48 Hours Incubation, Utility No. 3 Sludge

| Composition No. | Dosage ppm | Tube Results 1 | 2 | 3 |
|---|---|---|---|---|
| Blank | 0 | B* | B | B |
| 6 | 10 | B | B | B |
| 4 | 10 | ½ B | ½ B | ½ B |
| 7 | 10 | ½ B | B | B |
| 2 | 10 | B | B | ½ B |
| 6 | 50 | B | ½ B | 30 |
| 4 | 50 | **10 | 10 | 10 |
| 7 | 50 | B | B | ½ B |
| 2 | 50 | B | ½ B | B |
| 6 | 100 | B | 50+ | 50+ |
| 4 | 100 | 50+ | 50+ | 30+ |
| 7 | 100 | B | B | B |
| 2 | 100 | B | B | B |

*B - tube is black with growth
**Number represents the number of colonies

TABLE III

Biocide Test Results - Utility No. 3

| Composition No. | Dosage ppm | Tube Results 1 | 2 | 3 |
|---|---|---|---|---|
| Blank | 0 | 100 | 30 | 30 |
| 1 | 10 | 20 | 20 | 20 |
| 6 | 10 | 20 | 30 | 50 |
| 4 | 10 | 30 | 30 | 30 |
| 1 | 50 | 10 | 10 | 10 |
| 6 | 50 | 0 | 5 | 5 |
| 4 | 50 | 20 | 20 | 0 |
| 1 | 100 | 50 | 50 | 10 |

TABLE III-continued

| Biocide Test Results - Utility No. 3 | | | | |
|---|---|---|---|---|
| Composition No. | Dosage ppm | Tube Results 1 | 2 | 3 |
| 6 | 100 | 0 | 0 | 0 |
| 4 | 100 | 20 | 20 | 20 |

Having thus described our invention, we claim:

1. A method of controlling sulfate-reducing bacteria in flue gas scrubber sludges produced from scrubbing gases in utilities which sludges have a sulfate-reducing bacteria population greater than ten colonies of sulfate-reducing bacteria per ml of said sludges, which comprises treating said sludges with an effective amount of a sulfate-reducing bacterial biocidal composition chosen from the group consisting of a 1:1 weight ratio of sodium dimethyldithiocarbamate and disodium ethylene bisdithiocarbamate, and glutaraldehyde.

2. The method of claim 1 wherein the sulfate-reducing bacterial biocidal composition is glutaraldehyde.

3. The method of claim 1 wherein the sulfate-reducing bacterial biocidal composition contains a 1:1 weight ratio of sodium dimethyldithiocarbamate and disodium ethylene bisdithiocarbamate.

* * * * *